(12) United States Patent
Nee et al.

(10) Patent No.: US 6,842,865 B2
(45) Date of Patent: Jan. 11, 2005

(54) METHOD AND SYSTEM FOR TESTING MICROPROCESSOR BASED BOARDS IN A MANUFACTURING ENVIRONMENT

(75) Inventors: Patrick Nee, Co. Donegal (IE);
William Fenton, Co. Donegal (IE);
Ciaran Harvey, Co. Donegal (IE);
Malcolm Simmonds, Stoke on Trent (GB)

(73) Assignee: Formia Limited, Falcarragh (IE)

( * ) Notice: Subject to any disclaimer, the term of this patent is extended or adjusted under 35 U.S.C. 154(b) by 598 days.

(21) Appl. No.: 09/797,174

(22) Filed: Feb. 27, 2001

(65) Prior Publication Data

US 2002/0062461 A1 May 23, 2002

(30) Foreign Application Priority Data

Feb. 29, 2000 (IE) .......................................... S2000/0160

(51) Int. Cl.$^7$ ................................................ G06F 11/00
(52) U.S. Cl. ........................................... 714/28; 703/24
(58) Field of Search .............................. 714/28, 29, 27, 714/31, 33, 37, 741; 703/21, 23, 24, 25, 28

(56) References Cited

U.S. PATENT DOCUMENTS

| | | | |
|---|---|---|---|
| 4,056,299 A | 11/1977 | Paige | |
| 4,323,842 A | 4/1982 | McGarrity | |
| 4,467,275 A | 8/1984 | Maeda | |
| 4,637,020 A | 1/1987 | Schinabeck | |
| 4,718,064 A | * 1/1988 | Edwards et al. | 714/28 |
| 4,788,490 A | 11/1988 | Valaas | |
| 4,899,306 A | * 2/1990 | Greer | 710/64 |
| 4,985,893 A | * 1/1991 | Gierke | 714/29 |
| 5,392,293 A | 2/1995 | Hsue | |
| 5,406,217 A | 4/1995 | Habu | |
| 5,680,936 A | * 10/1997 | Beers | 209/564 |
| 5,949,984 A | * 9/1999 | Fujitaka | 703/23 |
| 6,027,354 A | 2/2000 | Bowers | |
| 6,127,836 A | 10/2000 | Jacobson | |
| 6,490,694 B1 | * 12/2002 | Fenton et al. | 714/25 |

FOREIGN PATENT DOCUMENTS

EP          0569128 A2     10/1993

* cited by examiner

Primary Examiner—Scott Baderman
(74) Attorney, Agent, or Firm—Nydegger & Associates

(57) ABSTRACT

A test system and method for testing a processor circuit board having at least one processor. The system includes a processor control circuit connected to the processor circuit board which enables test routines to be run on the processor of the processor circuit board, a peripheral emulator circuit, having a connector for connecting to at least one peripheral connector on the processor circuit board, for emulating at least one function of at least one peripheral device, a response circuit measuring the response of the processor circuit board to a test routine, a main controller in electronic communication with the processor control circuit and the response circuit. In operation, the processor control circuit receives instructions from the main controller and causes the processor on the processor circuit board to run a test routine. The response circuit will then communicate the results of the test routine to the main controller.

23 Claims, 11 Drawing Sheets

METHOD AND SYSTEM FOR TESTING MICROPROCESSOR BASED BOARDS IN A MANUFACTURING ENVIRONMENT

FIELD OF THE INVENTION

This invention relates to electronic test systems for testing microprocessor based circuits. In particular, the invention relates to electronic test systems and methods for testing PC motherboards.

BACKGROUND OF THE INVENTION

The manufacture of electronic circuit boards typically comprises two basic stages, i.e. board assembly and test. The test stage is typically performed as in-circuit testing and/or functional testing.

In-circuit testing verifies that the board has been assembled correctly. Ideally, it requires probing access to all component nodes on the board.

Functional testing performs an operational check to confirm that the circuit board operates as designed. Functional testing picks up any defects that an incomplete in-circuit test may have missed. There is a general trend in electronics testing away from in-circuit testing towards functional testing.

One key area in electronic circuit board manufacturing is that of personal computer (PC) motherboards. The manufacture of PC motherboards accounts for a significant percentage of total world-wide electronic manufacture. In PC motherboards, functional test access is generally via a board's connectors, so probe access is not essential. These connectors are designed to accept cables or other cards, so access is not normally a significant issue, as connectors are pre-placed there during assembly for access. In a test situation, connection to these connectors may be made manually or by automated means.

Current functional test practices require long test times, are labor intensive, and require complex engineering set up. For example, a current PC motherboard functional test process as typically might be situated at the end of an assembly line is currently performed using a complete system test. In such a complete system test a full set of peripherals, e.g. mouse, keyboard, hard disk, floppy disk, CD-ROM, is connected to the Unit Under Test (UUT), the PC is then booted to the operating system e.g. Microsoft Windows, and from the operating system a set of test programs is run. This test may be repeated later when the board has been assembled in its final housing.

This method of testing has a number of major deficiencies:

1. Test Time is long, typically 3–10 minutes per board. The main reasons for this are that the motherboard must be booted to the operating system first before testing can begin, the process is slowed by the speed of access to peripherals e.g. Hard disk access and read times, and because the testing is performed through the operating system most of the testing pertains to the peripheral and not the actual mother board under test. A further reason is that the test process is slowed is that the processor must determine during the boot sequence what devices and what configurations are present, e.g. the memory count seen when a computer is switched on.
2. Typically the average assembly rate of motherboards is sub-one minute. In order for the functional test section of the production line to keep up with the rest of the production line multiple testers are required. Thus increasing the cost of testing and the amount of floor space required for the functional test section.
3. Because there are multiple testers, tester operation is always manual or semi-automatic, i.e. there is no single flow in the process which may be automated.
4. If a board fails, the results give no indication of the nature of the failure. Thus when a board fails the manufacturer must perform a complete set of additional tests to determine and if possible repair the non functioning mother boards.

Electronic test systems per se are frequently used for diagnosis in the repair of electronic circuits. In a simple electronic test system, one or more test signals are applied to a unit under test (UUT) and the response of the unit is measured at one or more locations. Potential faults may be identified by comparing the responses obtained from the circuit under test with those of an ideally functioning circuit. However, these methods are generally restricted to use in repair and are unsuitable for use in a manufacturing line. Examples of these methods of testing microprocessor systems include:

1. "Scope and grope testing",
2. ROM (Read Only Memory) emulation,
3. Microprocessor emulation using cycle stealing, and
4. Microprocessor testing using the debug port of the processor.

In "scope and grope" testing, a technician determines the location or nature of a fault using one or more of a multiplicity of techniques, including for example continuity testing. In doing so, the technician isolates problems or faults using a combination of skill, experience, persistence and luck, but without the assistance of any automated testing. Particularly with complex boards such as microprocessor based boards, this type of testing in the repair environment is time consuming, requires experienced technicians and, in most situations, is uneconomic. In a manufacturing environment, this technique is completely out of place as the technique is used to find faults on a faulty board and not to test whether a board is working.

With ROM emulation, the boot-up ROM is replaced by a ROM emulator circuit. The boot-up ROM contains the initializing program to be run by a microprocessor each time it is switched on or reset. The ROM emulation circuit also provides a microprocessor with a program, but the program is designed as a diagnostic program rather than as a strict initializing program. Responses of the microprocessor and circuit to this program can be measured at various locations in the circuit. Typically, these ROM emulation circuits return test result information through the emulation circuit. This test information is processed by a computer for viewing on screen or for automatic highlighting of potential failures. A disadvantage of ROM emulation is that the method still possesses the problems of the existing method used in manufacture, i.e. connection to peripherals, etc. A further disadvantage is that the information must be returned through the ROM emulation circuit.

EP-A-0,191,632 describes the use of a method for returning data through the emulation circuit, wherein logic circuitry in the ROM emulator permits test data to be read over the system address bus (the data bus cannot be used in this instance since data cannot be written to a ROM device).

U.S. Pat. No. 4,622,647 discloses a gripper for use in conjunction with ROM emulation circuits. The gripper is connectable to a microprocessor and permits measurement of logic signals at the terminals of the microprocessor. This method does not necessarily rely on a diagnostic program in the ROM emulation circuit to return data, but typically does require such a program in order to run a test. The method described provides reliable data only from the microprocessor. The reliability of data from other locations relies on the integrity of components and connections, while in addition, the reliability of gripper connections is typically not high and false indications of errors are likely to occur frequently due to bad connections.

In microprocessor emulation using cycle stealing, as described in EP-A-0,067,510, the microprocessor in the circuit under test is replaced by a test circuit containing a similar microprocessor. This is unrealistic in the manufacturing environment where the purpose of the test is to ensure the board and processor are functioning correctly. Some chips permit an alternative method of disabling a chip by switching a particular input to a specific state. Typically this is achieved by placing a test clip over the processor. During testing, the test device interrupts the unit under test, injects a read or write cycle, collects the result, and then removes itself (logically not physically) from the buses of the unit under test. In addition, where the microprocessor has been disabled, rather than removed, a gripper or similar feature must be connected on top of the processor so as to connect with all the pins on the microprocessor. This is a troublesome method, and frequently failures will be highlighted by the test system arising not from a fault in the circuit under test but from a faulty connection between the gripper and microprocessor. Furthermore, the microprocessor itself is not tested using this technique.

Microprocessor testing using the debug port is a method only available for use with certain types of microprocessors, i.e. those that have a debug port. In this method, the test system connects directly to the processor in the unit under test via the processor's debug port. The electronic test system may connect to the debug port via either a port connector on the unit under test or an interposer card which sits between the processor and its socket. An advantage of this method is that the test system need only connect to a small number of pins on the microprocessor. Accordingly the possibility of an error arising from a poor connection with the test system is reduced. The technique suffers nonetheless from the requirement that peripheral devices be connected to completely test the system. The technique also provides no way of testing the busses of a processor circuit board.

Irish Patent Application No. 1576/89 discloses the use of a probe with a ROM emulation system. The probe enables signals to be detected at various locations around a circuit and returned for display on a computer system along with the results of the ROM emulation circuit. Thus faults can be localized, once they have been highlighted by another test method. In testing, the probe may be positioned by hand at the correct location and repositioned as required. This is useful where a single track is faulty, and the probe is used to find that track or the location on a track of a fault. However the technique is of no practical use in a manufacturing test environment but rather only in a test/repair environment.

A further problem with testing processor circuit boards arises because of energy saving features provided on processor circuit boards. These features typically place sections of the processor circuit board and peripheral devices into a sleep (low power mode) at certain times to conserve power, for example to preserve battery life, government regulations (e.g. US energy star requirements) and/or environmental reasons. A difficulty testing these features is that a wake up event must be generated in order to test the removing of these circuits from sleep mode. A further signal may also be required to place the system into sleep mode before the waking up process may be tested. Typically, the wake up event is performed by a test person pressing a key on a keyboard. Accordingly, the possibility of automating the test process is difficult.

Accordingly, there is a need for an improved system and method of testing circuit boards and in particular processor circuit boards (motherboards) for computers in the manufacturing process.

SUMMARY OF THE PREFERRED EMBODIMENTS

These shortcomings and others are addressed and substantially overcome by the present invention, which provides a method, apparatus and system for use with an electronic test system to enable the improved testing of circuit boards in the manufacturing environment.

Accordingly, the invention provides for a test system for testing a processor circuit board having a processor comprising a processor control circuit, adapted to connect to the processor circuit board under test, enabling test routines to be run on the processor of the processor circuit board, a peripheral emulator circuit, having a connector for connecting to at least one peripheral connector on the processor circuit board under test, for emulating at least one function of at least one peripheral device, a response circuit measuring the response of the processor circuit board under test to a test routine, a main controller in electronic communication with the processor control circuit and the response circuit, wherein the processor control circuit is responsive to instructions received from the main controller to cause the processor on the processor circuit to run a test routine, and where the response circuit communicates results of the test routine to the main controller.

The processor control circuit may comprise a ROM emulator or a debug port connection circuit which connects to the debug port of a processor. The processor control circuit may comprise adapter circuits enabling the test system to test more than one processor type.

The peripheral emulator circuit may emulate any combination of one or more of the following peripheral devices; mouse, keyboard, SCSI interface, video card, modem, serial port, parallel port, audio interface, hard drive, floppy drive, CD-ROM. The peripheral emulator circuit is responsive to signals from the processor circuit board under test and generates appropriate signals enabling the operation of processor circuit board under test. Optionally, the peripheral emulator circuit may be in electronic communication with the main controller and send electronic signals to the processor circuit board under test in response to a control signal from the main controller. The electronic signal sent by the peripheral emulator circuit may comprise a wake up event signal.

Optionally, the test system may further comprise a BUS tester, adapted to connect to a bus on the processor circuit board under test for sending and/or receiving data signals from a bus.

The response circuit is preferably implemented in the processor control circuit, peripheral emulator circuit or the BUS tester or a combination of these circuits.

The main controller may optionally comprise a PC-card insertable in a computer having circuitry for communicating with and/or controlling at least one of the following; BUS tester, peripheral emulator circuit, processor control circuit and response circuit. Standard test routines may be compiled for running on the computer.

The test system may present a tester with a simple pass/fail result. The test system may also provide indicative information concerning a failure to the tester. Optionally, the test system may connect to a further system to provide details of results, e.g. the test system may connect to a SPC system to communicate pass/failure statistics for quality analysis purposes. The test system may also cause the re-direction of failed processor boards out of the main production line and into a re-work or analysis area. This re-direction may be done automatically. The test system may be automated with a sensor indicating the arrival of a processor circuit board to be tested, a connector device connecting a combination of the BUS tester, peripheral emulator circuit, processor control circuit and response circuit to the processor circuit board to be tested, the test system determining whether the device passes or fails a test and only allowing devices which pass to progress to the next stage in a manufacturing line.

In a further aspect of the invention a method is provided for testing a processor circuit board having a processor, using a test system comprising a peripheral emulator and a processor controller, comprising the steps of connecting the peripheral emulator to a peripheral connector on the processor circuit board, connecting the processor controller for controlling the processor on the unit under test to the, instructing the processor controller to cause the processor on the processor circuit board to run a test program which sends test data to the peripheral emulator and checks for a response from the peripheral emulator indicating the success or failure of the test.

In another aspect of the invention a method is provided for testing a processor, using a test system comprising a peripheral emulator and a processor controller, comprising the steps of connecting the peripheral emulator to a peripheral connector on the processor circuit board, connecting the processor controller for controlling the processor on the unit under test to the, instructing the processor controller to cause the processor on the processor circuit board to run a test program, instructing the peripheral emulator to send test data to the processor, and where the response from the processor controller indicating the success or failure of the test.

In a further embodiment of the invention a peripheral emulator device is provided for emulating at least one function of at least one peripheral device.

The peripheral emulator device is provided with a suitable connection means enabling a electronic connection to be made with a processor motherboard under test. The peripheral emulator device is designed to respond to request signals sent from a processor motherboard under test in a predetermined fashioned, e.g. by sending a suitable response signal. Preferably, the peripheral emulator device is adapted to send signals to the processor motherboard under test without a request signal from the processor motherboard. An example of such a signal would be a wake-up event. Optionally, the peripheral emulator is provided with a control means enabling it to communicate with a main controller. The control means permitting data to be transmitted to and/or from the peripheral emulator device to the main controller. Accordingly, using such an arrangement test result data may be forwarded from the peripheral emulator device to the main controller, or the main controller could issue instructions to the peripheral emulator device to perform certain tasks. An example of such a task would be the sending of a wake-up event to the processor motherboard under test.

Further objects, features, and advantages of the present invention will become apparent from the following description and drawings.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
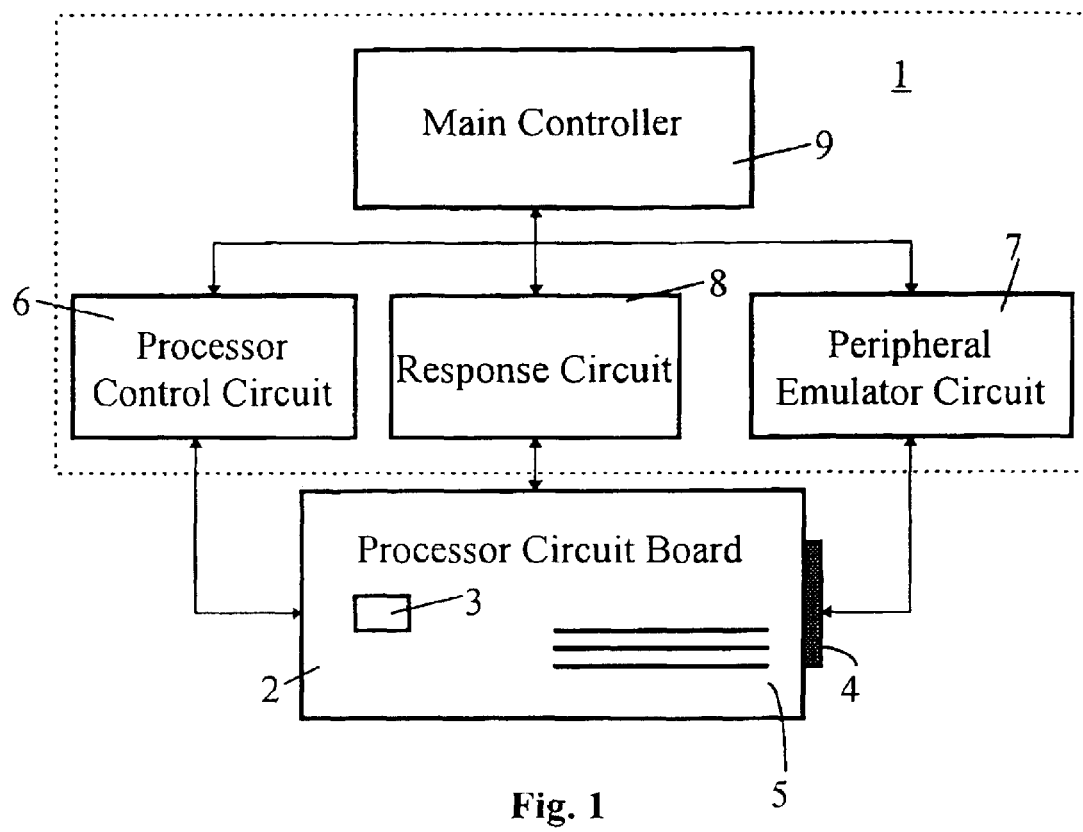
FIG. 1 is a block diagram of the structure of a test system according to one embodiment of the invention.

A test system 1, for testing a unit under test (UUT) comprising a processor circuit board 2, typically having a processor/central processing unit (CPU) 3, connectors 4, for peripheral devices and one or more bus expansion slots 5, according to a first aspect of the invention, as shown in FIG. 1, comprises a processor control circuit 6, a peripheral emulator circuit 7, a response circuit 8, and a main controller (Functional Test Controller) 9.

The peripheral emulator circuit 7, is connectable to the processor circuit board 2 using the connections 4 typically used by the peripheral devices themselves or at alternate connection points, e.g. a bus slot 5. The peripheral emulator circuit 7 emulates one or more peripheral devices and responds to and generates signals similar to that of a real peripheral device. The emulation circuit 7 need not re-produce the full features of the actual peripheral but merely enough to indicate that the communications with the processor circuit board 2 are working and that the processor circuit board 2 is responding appropriately to signals from the emulator peripheral device 7. As a result, the actual emulation function and responses produced by the peripheral emulator circuitry 7 need not match the exact response of a real peripheral but merely respond in a way that may be used to confirm the correct operation of the UUT 2.

The peripheral emulator circuitry may be built on more than one circuit board, and may have a plurality of connectors for connecting to different peripheral connectors on a UUT 2.

The processor control circuit 6 enables control to be taken of the processor 3 of the UUT 2 and facilitates the downloading and running of test routines on the processor in response to instructions from the main controller. The processor control circuit 3 of the UUT 2 may also send data back to the main controller 9, for example the results of a test. Examples of suitable techniques for use in implementing the processor control circuit 6 include the use of the debug port of a processor (if available) and ROM emulation.

The response circuit 8 may be a separate device, e.g. a bus monitor or it may be incorporated into the circuitry of the processor control circuit 6 and/or peripheral emulator circuitry 7 or a combination of these arrangements. The purpose of the response circuit 8 is to provide a signal to the main controller 9 to identify whether the UUT 2 is functioning correctly. For example, using a bus tester as a response circuit 8 the main controller 9 might issue instructions to the processor circuit board 2 to send an all highs (FF) followed by an all lows (00) signal to a bus. The bus tester would forward the data on the bus to the main controller 9, wherein an all highs response signal followed by an all lows response signal would indicate success whereas any other responses would indicate a failure.

Using the peripheral emulator device 7 as the response unit 8, the main controller 9 might issue an instruction to the processor control circuit 6 to cause the processor 3 of the UUT 2 to send a test signal to a peripheral device, wherein the peripheral emulator device 7 would forward any data received to the main controller 9. If the data received matched the signal sent by the processor 3 of the UUT 2 then this would indicate success, a mis-match would indicate failure.

Using the processor control circuit 6, as the response unit 8 the main controller 9 might issue an instruction to the processor control circuit 6 to send a test signal to a device e.g. a peripheral device, wherein the peripheral device would respond appropriately. The response from the peripheral device received at the processor control circuit 6 could be used to indicate success or failure and an appropriate signal forwarded from the processor control circuit 6 to the main controller 9 to indicate the success or failure of the test.

These exemplary techniques and others may be combined to produce a comprehensive testing scheme for a UUT 2.

Figure 2:
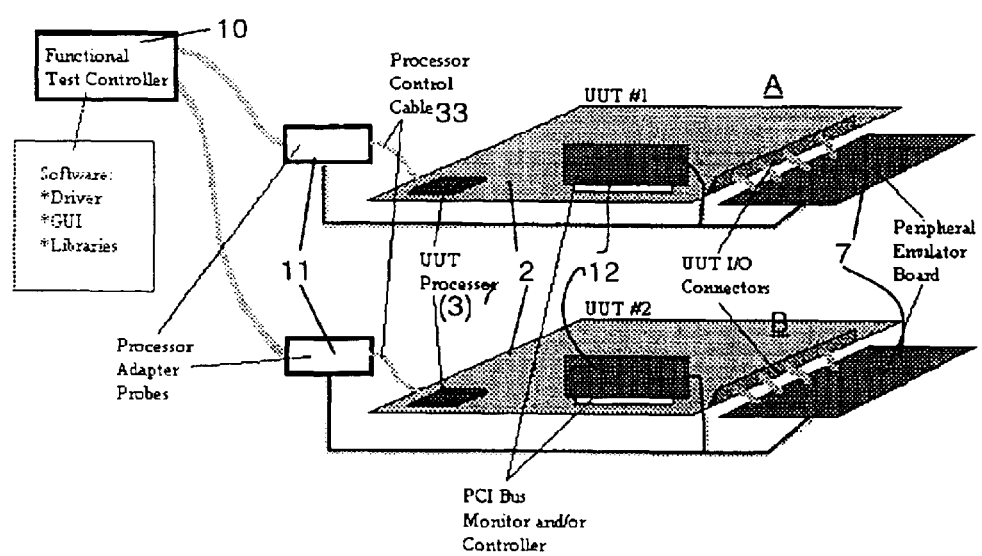
FIG. 2 is a pictorial view showing the structure of a test system according to one embodiment of the invention.

An embodiment of FIG. 1 using the technique of debug port control for the processor control circuit 6, as shown in FIG. 2, comprises a Main Controller (Functional Test Controller) 10, Processor Control Circuit (Processor Adapter Probe) 11, Peripheral Emulator Board (PEB) 7, and optionally a Bus Monitor and/or Controller 12.

The Functional Test Controller (FTC) 10 corresponds to the main controller 9 of FIG. 1. The FTC 10 is connected by a suitable connection means including for example a cable 13, which connects to the Processor Adapter Probe (PAP). A shorter cable connects the PAP 11 to the PEB 7. Accordingly, the FTC 10 is connected to the PEB 7 via the PAB 11. This method of connection means that a single buffering circuit in the PAB 11 may be used by both the PEB 7 and PAB 11, because the distance from the PAB 11 to the PEB 7 is typically small compared to the distance between the FTC 10 and PEB 7. This method of connection is more economic and simpler for connectivity than two separate cables.

The example FTC 10 shown provides for connection to more than one test set-up A, B i.e. more than one UUT 2 may be tested at a time. Alternatively, one UUT 2 may be connected/disconnected while an other is being tested. Optionally, Multiple FTCs 10 may be used in a single host computer (e.g. using a plurality of PCI/PXI 20 cards) to facilitate testing of a greater number of UUTs simultaneously.

Figure 3:
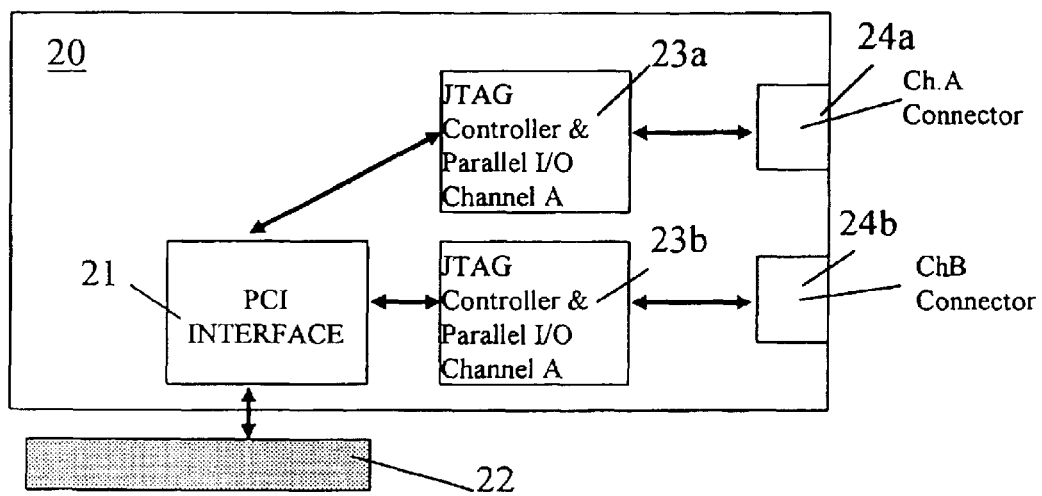
FIG. 3 is a block diagram of a Functional test controller according to one aspect of the invention.

The connection and control means for the FTC 10 may for example use a PCI card enabling a connection to be made by insertion into a PCI socket of a host computer, or as a PXI (PCI variant for instrumentation applications, stands for PCI extensions for Instrumentation) card which may be plugged into a PXI mainframe chassis of the host computer. A suitable circuit arrangement for a PCI/PXI card 20, as shown in FIG. 3, comprises a PCI interface 21 enabling the card to interact with the PCI bus of the host computer 22. The PCI interface 21 transmits and receives data to and from the host computer to a Joined Test Action Group (JTAG) controller 23a, 236 which generates signals for sending to the JTAG lines of the processor on the board under test along with parallel input/output circuitry for sending receiving parallel signals for removing control from the processor on the board under test and placing it in control using the JTAG lines, 24a, 246. The JTAG controller and the parallel input/output circuitry connect to connectors which provide for a cable connection to the PAP's 11. The example PCI/PXI 20 card shown provides as with the examplary test system of FIG. 2 for connection to PAP's 11, and accordingly two UUT's at any one time.

The host computer 22, is typically configured to use a standard operating system e.g. Microsoft NT. Thus the test system may be using software running on the host computer 22. This software can optionally connect to industry standard programming languages, e.g. Windows API. Accordingly, the software may readily be included in test set-ups and manufacturing lines. Test executive may be used to control the sequence of a test using multiple instruments, it also permits transparent access to databases and for SPC (Statistical Process Control) and Graphical User Interfaces (GUI). To reduce engineering development times, standard test libraries can be written for the most common PC board circuits.

As described above, the FTC 9, 10 may connect to the other devices, e.g. PEB 7, BUS monitor 12, via suitable means, e.g. a cable 13, optionally, via the PAP 11. Connecting via the PAP 11, allows a single buffer circuit to be used for all of the various sub components as these are typically positioned close to each other. The use of a single buffer circuit is less expensive than using separate buffer circuits.

Figure 4:
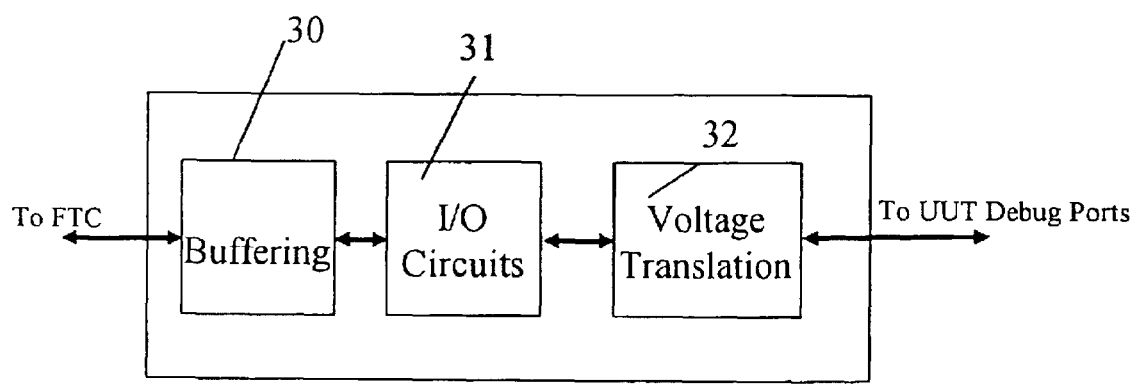
FIG. 4 is a block diagram of a processor adapter circuit according to one aspect of the invention.

The Processor Adapter Probe (PAP) 11, also called a Personality Pod, provides a connection between the FTC 10 and the processor 3 on a UUT 2. The PAP 11 unit adapts the FTC 10 for connection to a particular type of processor (e.g. Pentium, PowerPC, ARM). Each PAP 11 allows the UUT's processor to be controlled from the FTC 10. The PAP 11 may comprise, as shown in FIG. 4, a buffering circuit 30, Input/Output (I/O) circuits 31, and a voltage translation circuit 32, and a processor connection means 33. Different PAP's may be used for different types of processor. The buffering circuit 30 ensures that communication between the FTC 10 and PAP 11 is not affected by the use of long cables. The voltage translation circuit converts the standard voltages used by the FTC 10 and PAP 11 to levels used by the Processor 3 of the UUT 2. For example, the PAP 11 and FTC 10 may use 5 Volt signal levels whereas a Pentium Processor may use a lower voltage for its signal lines (e.g. 2.5 or 1.5 Volts). The voltage translation circuitry 32 would convert any 5 Volt signal going to the Processor to a lower voltage and converts any low voltage signal coming from the processor to a 5 Volt level signal. The processor connection means 33 may be provided by a clip or connector which connects on to a processor directly or alternatively to a debug port connector on UUT, 2. The I/O transmit and receive data between the FTC, 10, and the processor via the buffering 30, voltage translation 32, and processor connection means.

Using the debug port of the processor 3, available for example on Intel Processor, PowerPC, Arm types of processors, the FTC 10 may take control of the processor 3 and send commands directly to the processor for execution. To take control of the processor 3, a processor request signal (e.g. PREQ line on Intel processors) is sent via the debug port connection to the processor. The Processor then halts normal operation and hands control to the debug port. Once in this state, instructions may be sent to the processor for execution via the debug JTAG (Joined Test Action Group) lines.

In conducting a test using the debug port of the processor, the FTC 10 may take control immediately from the normal boot up process using the debug port. Alternatively, the FTC 10 may allow the processor to execute a portion of the normal boot up routine before interrupting the processor and taking control via the debug port. Once in control the FTC 10 can command the UUT's processor 3 to test the UUT's circuitry in various ways (e.g. memory test, video test, etc.).

Instead of using real peripherals, a Peripheral Emulator Board (PEB) 7 is used to emulate one or more peripheral devices. The emulator board/or boards 7 may not provide complete emulation of a peripheral but simply enough of the peripherals functionality in order to fully test each I/O circuit on the UUT. If a real peripheral were used, much of the tests running under the operating system (e.g. Windows 95) would pertain to the peripheral devices and not the UUT. Preferably, the Peripheral Emulator Board 7 uses solid state devices to emulate the peripherals, accordingly the tests are not slowed by mechanical devices, such as disk drives.

Figure 5:
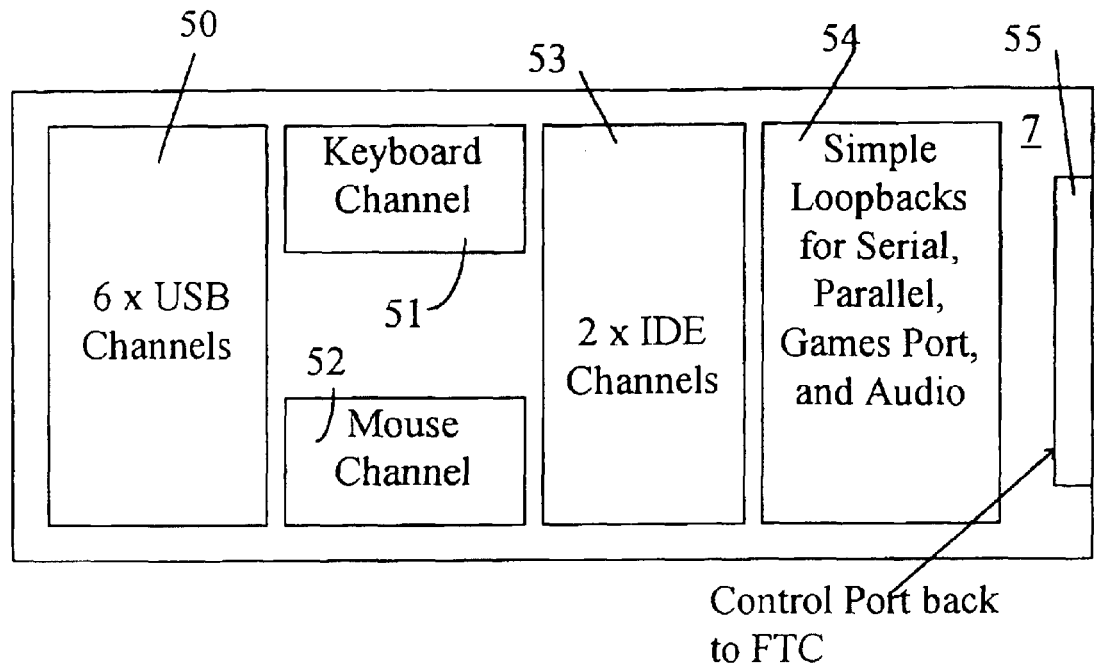
FIG. 5 is a block diagram of a peripheral emulator device according to one aspect of the invention.

An example of a suitable Peripheral Emulator Board 7 as shown in FIG. 5, comprises a plurality of individual emulators or channels 50, 51, 52, 53, 54, in the present example, one or more USB emulators 50, a keyboard emulator 51, mouse emulator 52, two IDE emulators 53, and one or more wiring feedback loops 54. These emulators may be constructed as individual items but are preferably constructed on the same board for ease of construction, control and/or communication with the FTC 9, 10. The emulators may communicate with the FTC 9, 10, via a Control Port 55. Accordingly, the individual emulators may if adapted to do so forward result data to the FTC 9, 10, and/or generate test signals in response to an instruction from the FTC 9, 10, e.g. a wake up event.

The USB (Universal Serial Bus) 50 emulators may be implemented using a microcontroller. The microcontroller may be programmed to respond to input signals with suitable response signals as if it was an actual USB device. A suitable controller for this purpose would be a USB microcontroller, e.g. the CY7C6301A, supplied by Cypress Semiconductor Corporation of San Jose, Calif. This microcontroller has an onboard EPROM which may be used to store a program which when run would emulate a USB. Inputs and outputs to the emulator would be connected to the microcontroller via the plurality of output/input lines it possesses. The microcontroller also features an 8-bit RISC Engine, built in USB interface, and a 35 instruction set optimised for USB, and in-built RAM. As an example of operation, the microcontroller may be programmed to simply return an ID when prompted by the processor 3 of the UUT 2. The microcontroller may also be programmed to respond to instructions received from the FTC 9, 10, via the Control Port of the emulator board, and in this way the FTC 9, 10, can command the USB emulators to generate wake-up events, in order to perform power management testing. Power management is where the processor (and/or other devices) can be placed into a sleep mode to save power. Certain peripheral events, such as a keystroke on a keyboard may be used to wake up the processor and other devices. The PEB 7, may be programmed from the FTC 9, 10, to emulate these events in order to verify that power management is working.

Figure 6:
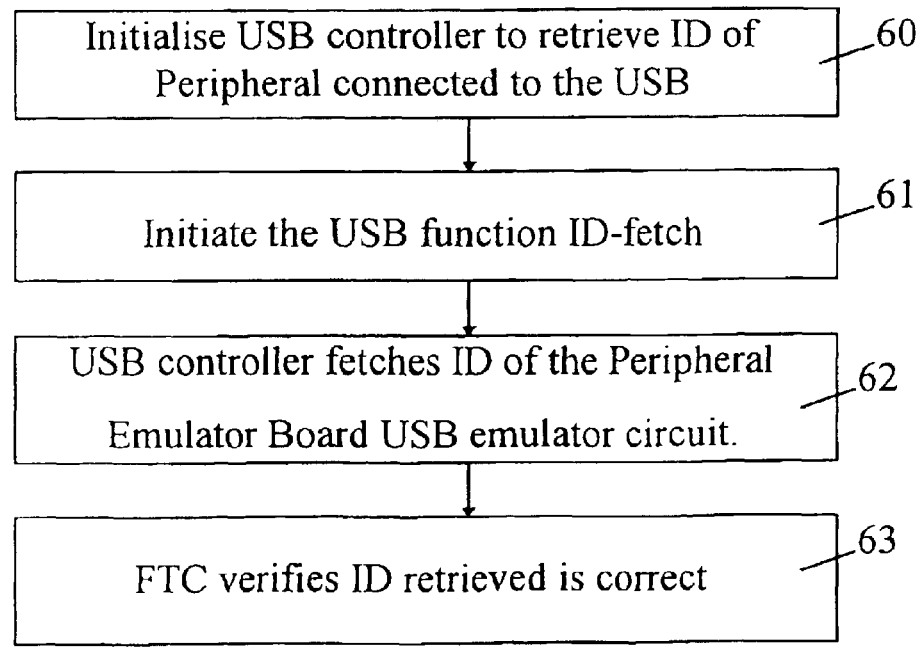
FIG. 6 is a flow chart illustrating a sample test for use with a USB emulator device according to an embodiment of the present invention.

A sample test routine using the USB emulator is shown in FIG. 6. This routine comprises the steps of:
1. Initializing 60 the USB controller of the UUT 2 to retrieve the ID (identification code) of the Peripheral connected to the USB (in this case the PEB). The initializing of the USB controller is performed by the processor control circuit issuing an appropriate set of instructions to the processor, i.e. using a debug port or ROM emulator circuit.
2. Initiate 61 the USB function ID-fetch on the USB controller of the UUT using the processor control circuit.
3. The USB controller of the UUT fetches 62 the ID of the Peripheral Emulator Board USB emulator circuit.
4. The FTC verifies 63 that the ID retrieved is correct from data forwarded by the processor control circuit, i.e. using debug port or ROM emulator technique.

Figure 7:
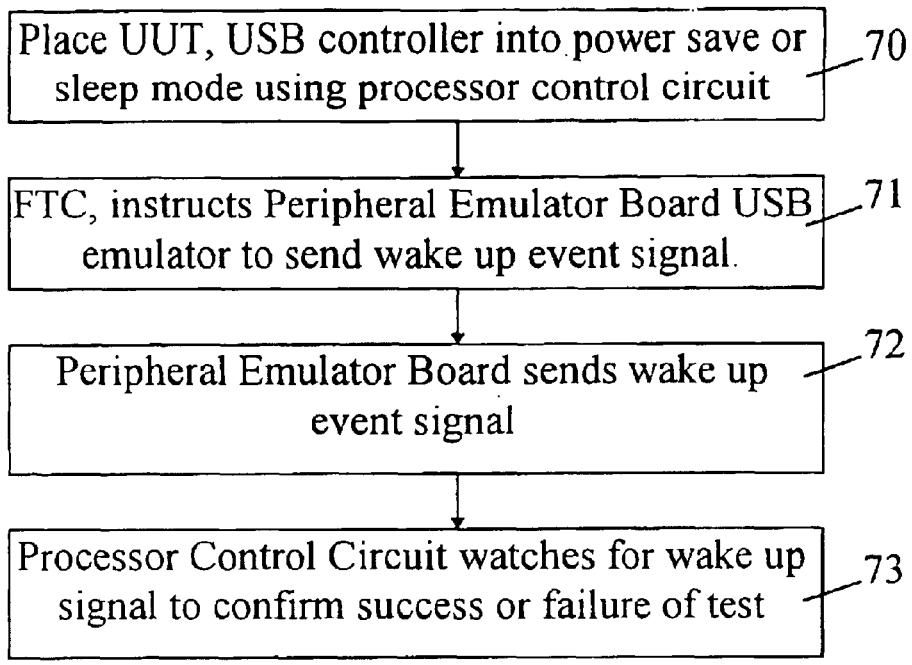
FIG. 7 is a flow chart illustrating a sample test using a wake-up event for use with a USB emulator device according to an embodiment of the present invention.

To test power management, a typical test sequence might comprise, as shown in FIG. 7, the steps of:
1. The UUT USB controller is placed 70 into power save (sleep) mode using the processor control circuit.
2. The FTC sends 71 an instruction to the Peripheral Emulator Board USB emulator via the control port to send a wake up event signal to the UUT USB controller.
3. The USB emulator of the Peripheral Emulator Board sends 72 a wake up event signal to the UUT USB controller.
4. The Processor Control Circuit watches 73 for the wake up signal to arrive from the UUT USB controller at the processor of the UUT.

The keyboard and mouse channels 51, 52 of the emulator are similar and may be emulated using a single microcontroller. A suitable microcontroller for this purpose is the PIC12C508 from Microchip, Inc., of Phoenix, Ariz. This microcontroller allows for in-circuit serial programming and has a small easy to use instruction set, along with an internal oscillator and a board eeprom. The microcontroller may watch for signals sent to the keyboard or mouse port on the mother board and respond accordingly, for example the microcontroller may be programmed to react simply by echoing back to the UUT data sent by the UUT 2. The microcontroller may also generate/send specific signals to the keyboard and/or mouse ports of the UUT in response to instructions received from the FTC 9, 10 via the Control Port 55 and in this way the main tester 9, 10 can command the emulators to generate wake-up events, in order to perform power management testing, as explained above.

Figure 8:
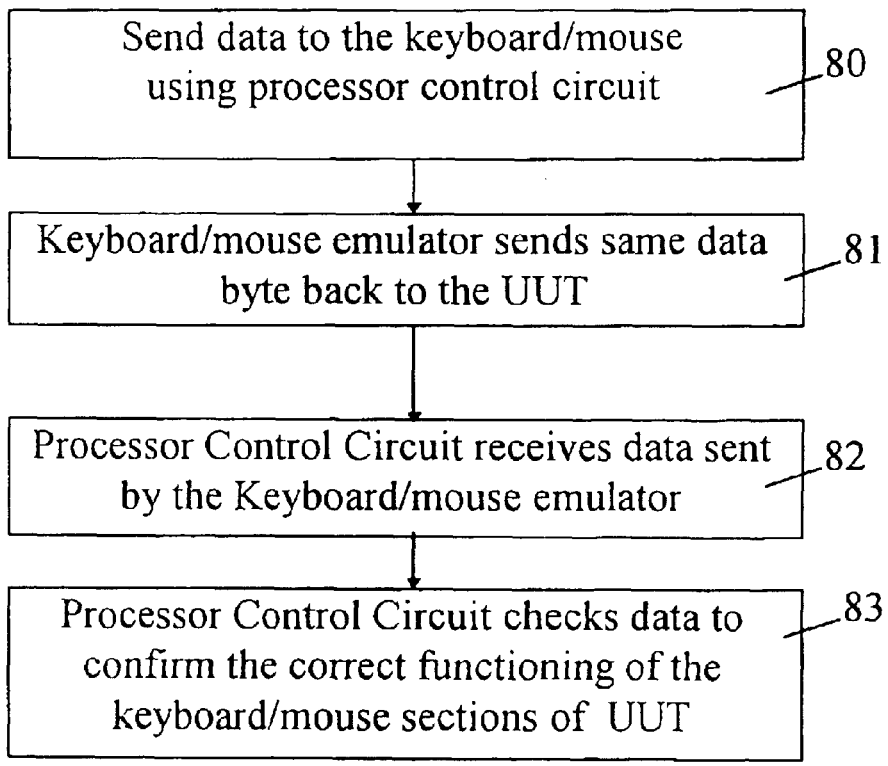
FIG. 8 is a flow chart illustrating a sample test for use with a keyboard/mouse emulator device according to an embodiment of the present invention.

A typical test sequence for the Keyboard/mouse emulator 51, 52 may consist of, as shown in FIG. 8, the steps of:

1. Send 80 a data byte to the keyboard or mouse emulator via UUT keyboard/mouse controller using processor control circuit.
2. Keyboard/mouse emulator responds by sending 81 the same data byte back to the UUT.
3. The byte received 82, 83 is checked for correctness by the processor control circuit which obtains the data received back from the Keyboard/mouse emulator 51, 52 from the processors.

Figure 9:
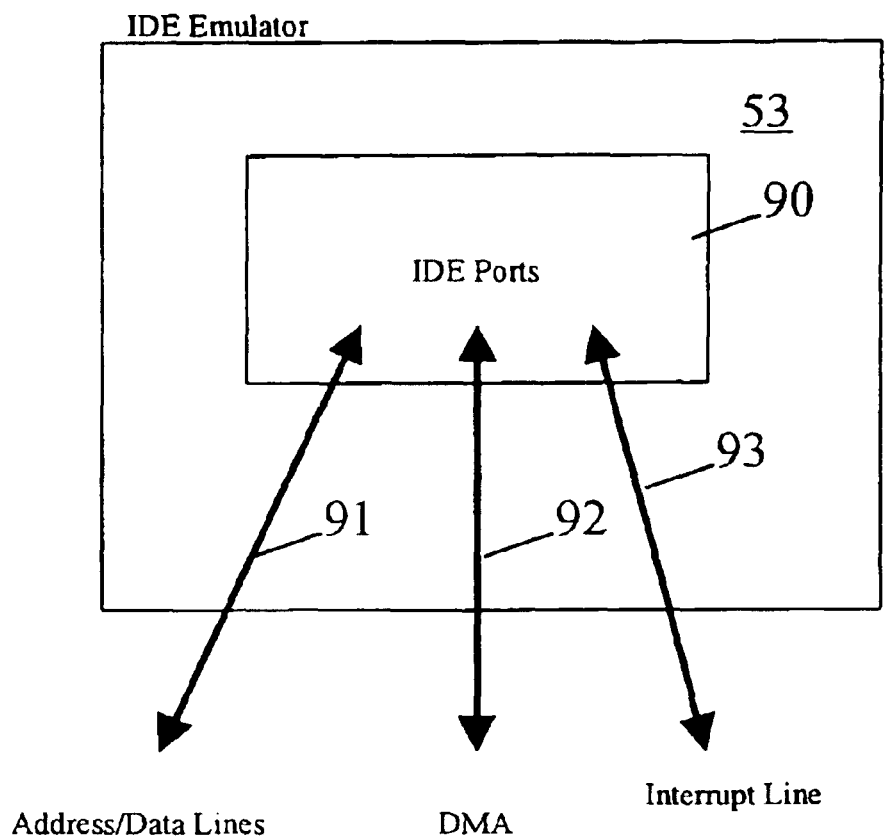
FIG. 9 is a block diagram of a IDE emulator suitable for use in a peripheral emulator according to the one embodiment of the present invention.

The example Peripheral Emulator Board of FIG. 5, includes two IDE (Integrated Drive Electronics) channels 53 each of which may be emulated using logic implemented in a Complex Programmable Logic Device (CPLD). A block diagram of the IDE emulator circuit 53, as shown in FIG. 9, comprises a central logic block (e.g. a CPLD) 90, which connects to the Address and data lines 91, the DMA (direct memory access) 92, and interrupt lines 93. The CPLD 90 is configured to respond to signals from these lines in a predetermined manner, which can be used by the FTC 9, 10, via the Response Circuit 8, (e.g. Processor Control Circuit 6) to test for normal operation or failure.

Figure 10:
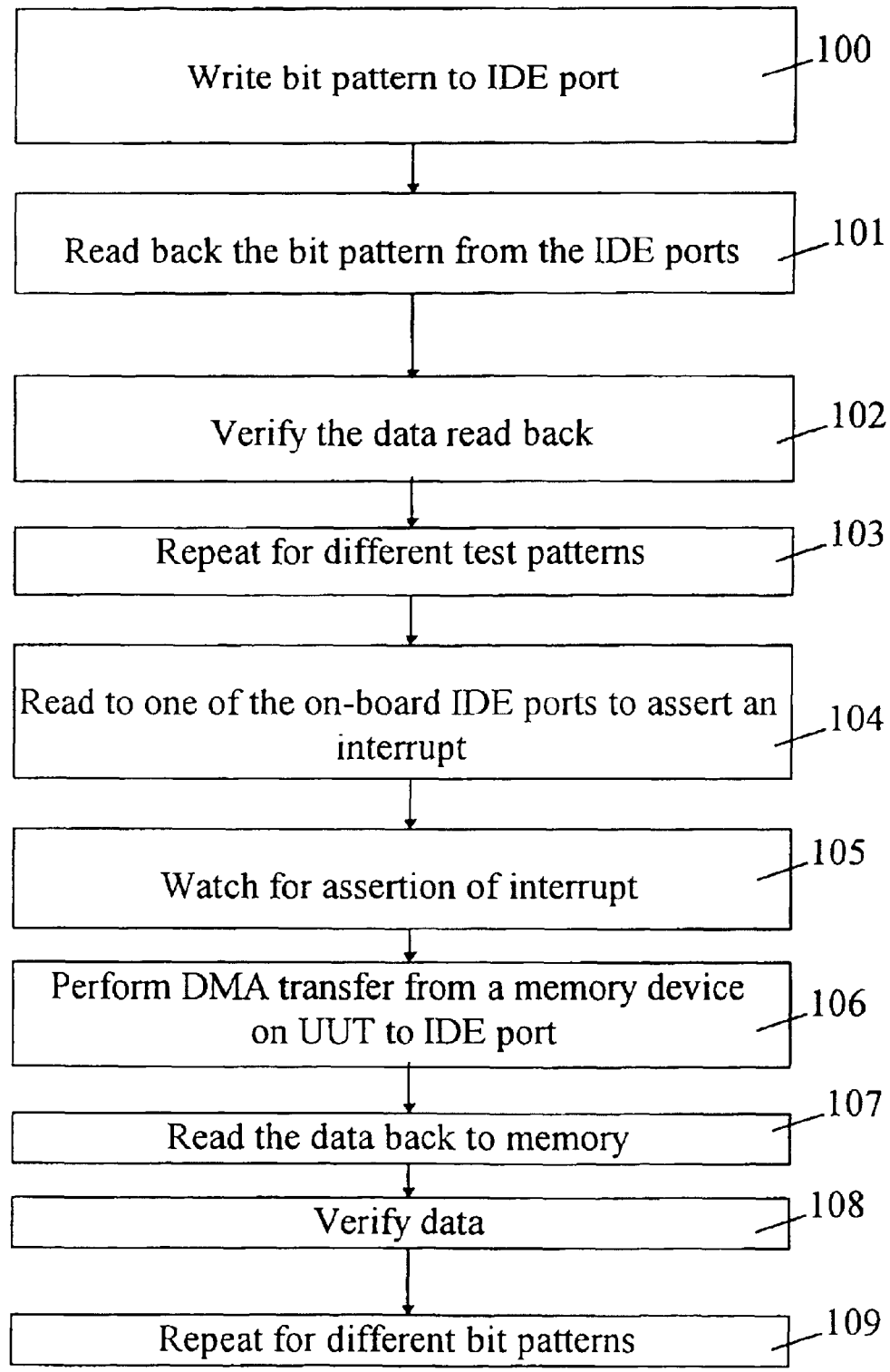
FIG. 10 is a flow chart illustrating a sample test for use with a IDE emulator device according to an embodiment of the present invention.

A UUT IDE test may consist of, as shown in FIG. 10, the steps of:

Address/Data

1. Address/data lines: Write 100 a bit pattern to the various IDE ports, e.g. all ones (FF).
2. Read back 101 the bit pattern from the IDE ports.
3. Verify 102 the data sent and data read back agree.
4. Repeat 103 for different test patterns. E.g. all zeros, alternating ones and zeros pattern (M or 55).

Interrupt

5. Read 104 to one of the on-board IDE ports to assert an interrupt.
6. Watch 105 for assertion of interrupt, failure indicated by non-assertion.

DMA

7. Perform 106 a DMA transfer from a memory device on UUT to one of the IDE ports.
8. Read 107 the data back to memory and verify it 108.
9. Repeat 109 for different bit patterns.

All of the above steps may be controlled and initiated using the processor control circuit, 6.

Very simple wiring loopbacks 54, which simply connect output lines from the UUT 2 to input lines on the UUT 2, enable these output lines and input lines to be tested simply, i.e. if a specific data signal is sent to an output port, is the same data signal received back at the input port? If not, then there is clearly a fault in the output or input port. All of these may be controlled/tested directly from the processor control circuit. Examples of where this technique may be used include the transmit and receive lines on a serial port may be connected (i.e. RTS to CTS; DTR to DCD; DSR to RI) or the audio-in may be connected the audio-out on an audio port i.e. generate sound on speaker-out, digitize and measure via microphone in and line-in.

The Parallel port may be tested using an emulator which comprises a simple latching circuit, whereby data could be sent to parallel I/O lines, whereupon the emulator would latch this data and subsequently send the data back via the parallel port input status lines. The data sent back may be checked to confirm that the data transmitted to the parallel port matches the data received.

Other emulation devices that may be included on the peripheral emulator device 7, include video, floppy drive, network interface, and SCSI.

Examples of tests that may be run on these emulation devices would include:

Video: Verify video signals Vsync (vertical sync) and Hsync (horizontal sync) by measuring their frequency. Verify red, green and blue outputs by measuring the voltage present at these signals during selected line scans.

Network: loopback transmit to receive. Transmit a packet of data, receive data should equal transmitted data.

Floppy: loopback of output to input control signals. Output data is de-serialized and stored in memory. Data is then retrieved from memory, serialized, and sent back as read data.

The Control Port 55 of the emulator board 7 connects the peripheral emulator board 7 back to the main tester 9, 10 and provides the FTC, 9, 10 with control over the various emulation functions. It does this by providing external signals from the FTC 9, 10, to the various emulation circuits. The Control Port 55, may be implemented as a simple parallel communications channel, having data, address, control lines with each emulator having an assigned address. In such an arrangement, the FTC could send the address of a particular emulator device on the address lines, and then send or receive data on the data lines from the peripheral emulator device. The emulation circuits 50, 51, 52, 53, 54 may be adapted to respond appropriately to a signal received from the FTC. The primary function of this technique is to allow the FTC 9, 10, to generate/send signals (e.g. wake up signals) to the UUT 3. For example, using this the processor control circuit 6 could place the UUT 3 in a sleep (low power) mode, the FTC 9, 10, could then instruct an emulator circuit 50, 51, 52, 53, 54, via the control port to generate a wake-up event. An emulator device which could do this would be the serial emulator which could be used to generate a RI (ring indicator) signal to indicate that the phone is ringing and the UUT should wake up to deal with the call. If the UUT fails to leave sleep mode, there is clearly a failure on the UUT.

In an optional embodiment, the peripheral emulator board 7, may be used as a response circuit sending details of test signals received from the UUT 2, to the FTC 9, 10.

Figure 11:
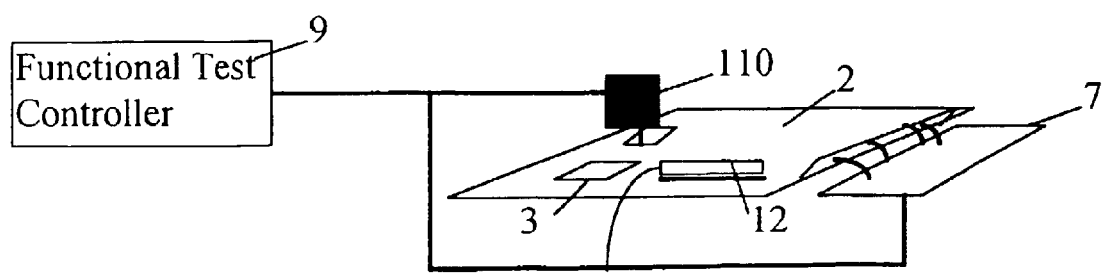
FIG. 11 is a pictorial view showing the structure of a test system according to alternative embodiment of the invention to that of FIG. 2.

An alternative set-up, as shown in FIG. 11, to the processor control circuit of FIG. 1, uses ROM emulation in place of the PAP 11, and Debug Port of FIG. 2. This alternative technique uses the Peripheral Emulator device 7, in the same way as the embodiment of FIG. 2. The alternative processor control circuit uses a ROM emulation device 10, which comprises emulation hardware and a suitable connector, e.g. a clip, for connecting to the boot ROM 11 of the UUT. The technique of ROM emulation is well known in the art, examples of the technique are for example provided in Irish Patent Application No. 1576/89. In summary, the ROM emulator circuitry 10 disables the boot ROM 11 of the unit under test. The ROM emulator then loads its own boot code program into the emulator to cause the processor 3 of the UUT 2 to run a series of tests. In this way, the ROM emulator 10 takes control of the processor 3 of the UUT 2. Results may be obtained from the ROM emulator by using appropriate techniques, e.g. EP-A-0,191, 632 describes the use of a method for returning data through the emulation circuit, wherein logic circuitry in the ROM emulator permits test data to be read over the system address bus.

PCI Bus Monitor and/or Controller:

There is a trend towards decreasing test access to boards and access is becoming limited to board connectors and bus slots. To provide improved testing a further connection is provided for connecting a bus test unit to a bus which may perform full bus testing under the control of the FTC 10. The use of a bus tester 2 provides an alternative to the requirement for interconnect testing as performed by traditional in-circuit testers(i.e. physically measuring the connectivity between pins/nodes on a circuit board) between the processor and other devices on the UUT.

The BUS tester 12 of FIG. 2 (and FIG. 11) may be used as a response unit to ensure the correct functioning of the busses of the UUT 2. A microprocessor board 2 (of the type to be tested) will typically comprise several bus layers. The top bus layer in the hierarchy is reserved for devices communicating at high speeds with the processor, e.g. main memory.

The next bus layer in the hierarchy is typically the PCI (peripheral component interconnect) subsystem and this controls the faster I/O devices, such as video adapters. Connections are typically provided at this layer in the form of bus slots, for connecting further expansion boards to the system.

A further bus layer is the ISA (industry standard architecture) subsystem. The ISA subsystem controls the slower I/O devices, examples of which include mouse, keyboard, serial port etc. Bus slots may also be provided in this layer to provide for connection of expansion boards to the system. Other bus layers of a system may include PMC, Compact PCI, PC/104 and AGP, which may or may not have bus slots provided for connection of boards.

The various layers of a system are connected by means of devices called bridges. These bridges act as interfaces between the standard protocols of the different busses, to facilitate communication between the various layers of the system hierarchy.

Test signals may be sent using the processor control circuit 6, and responses obtained from the bus monitoring system 12. These responses can be compared with normal responses to highlight faults, and/or A simple example of such a test is the placing of an all ones signal on the data bus by the processor control circuit. This signal is sampled at the bus slot by the bus tester circuitry. Any lines of the data bus which are not measured as a one highlight a fault, possibly a "stuck bit". A "stuck bit" or "stuck" is where a line remains in a permanent high (one) or low (zero) state. A frequent cause of "stucks" is shorts to ground or to the supply voltage in a circuit.

Figure 12:
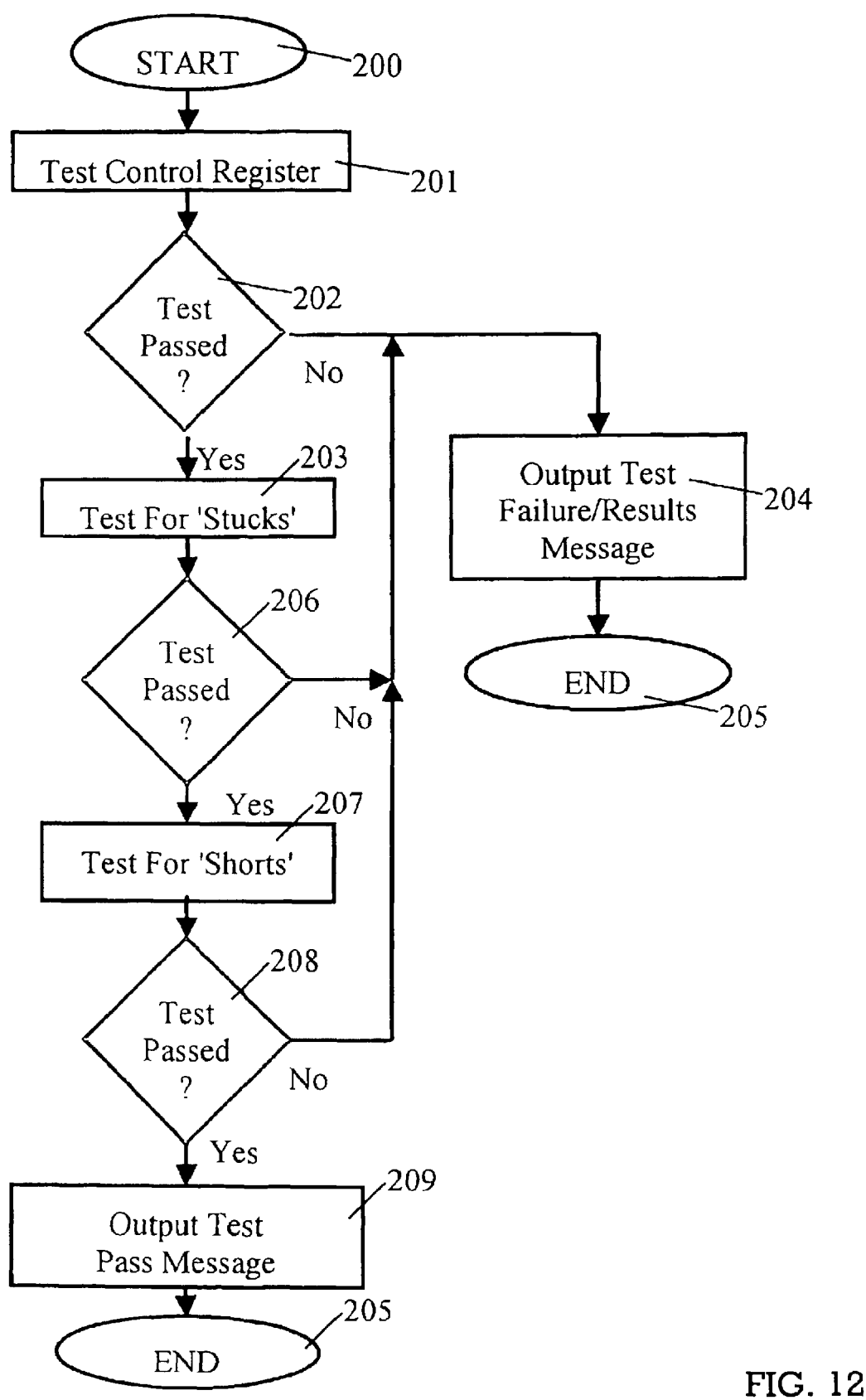
FIG. 12 is a flow chart illustrating a sample test for using a BUS tester device according to an embodiment of the present invention.

In general, a series of tests using the bus tester are arranged in a specific order to find an error. An example of a typical test sequence, shown in FIG. 12, initially tests the control lines. If the circuit under test passes this initial test, then the test system tests first for "stucks" and subsequently "shorts". If the circuit under test fails any of these tests, the test system identifies the UUT 2 as a failure.

Several bus cards may be connected simultaneously using a single cable, to the FTC, to improve the speed and efficiency of the testing process. Each bus card may be used to test a separate bus. In this way, the PCI and ISA bus layers may be tested in the same session without any intervention by a technician being required to move connections or change switch settings, etc. Each card may be connected individually to the FTC or by way of a common cable. In the latter case, each card is assigned a unique address by means of one or more switches on the card. This address assignment permits individual card identification. Each additional switch increases the number of addresses and hence the number of cards that may be connected by a factor of two. For example, if four switches are used, then 16 cards may be connected simultaneously.

The internal circuitry of a bus card will be similar regardless of the bus type (e.g. ISA, PCI, etc.) being tested, the main difference between cards for different layers or systems being the size and arrangement of the bus slot connector, or other connection means, as well as which small changes may be present in the bus capture unit.

Figure 13:
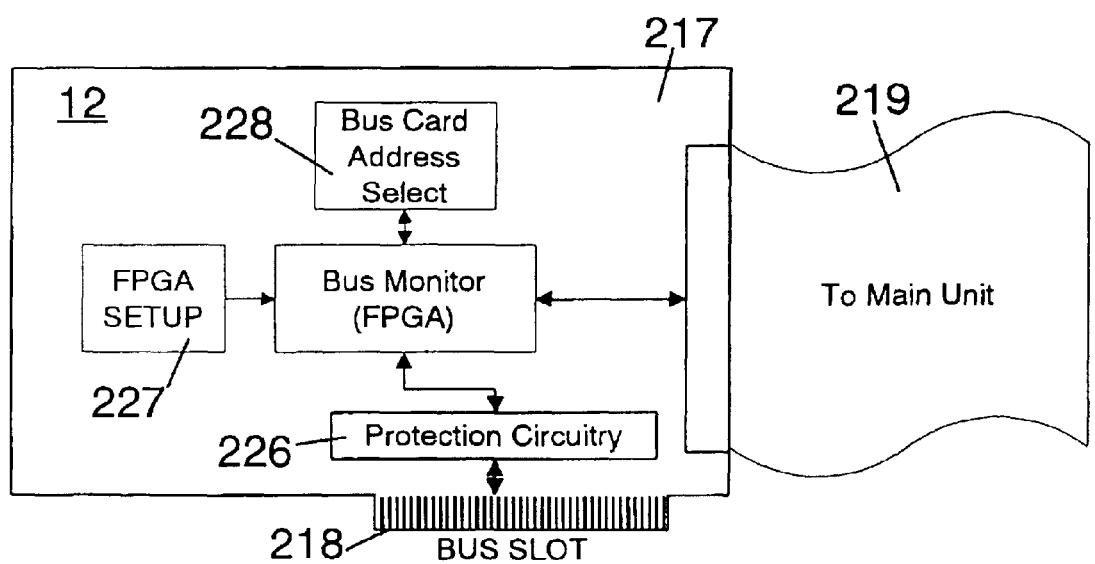
FIG. 13 is a pictorial representation of a bus tester for use with the present invention.

A typical circuit configuration for a bus test card is illustrated in FIG. 13. The connection to the circuit under test is made by the bus slot connector 218. Protection circuitry 226, ensures that a bus test card 12, is not damaged when plugged into a faulty circuit. The bus monitor 12, is implemented using a FPGA (Field Programmable Gate Array) 229. A FPGA is a re-configurable device, i.e. its internal hardware structure can be changed by changing the associated FPGA set-up component 227, which is also located on the bus test card 12.

In operation, a control signal is sent from the FTC 9, 10, via the connecting cable 219. This identifies the address of the particular bus test card requested. The FPGA circuit 229 is only activated when the address identified by the main test apparatus matches the bus test card switch settings 228.

Figure 14:
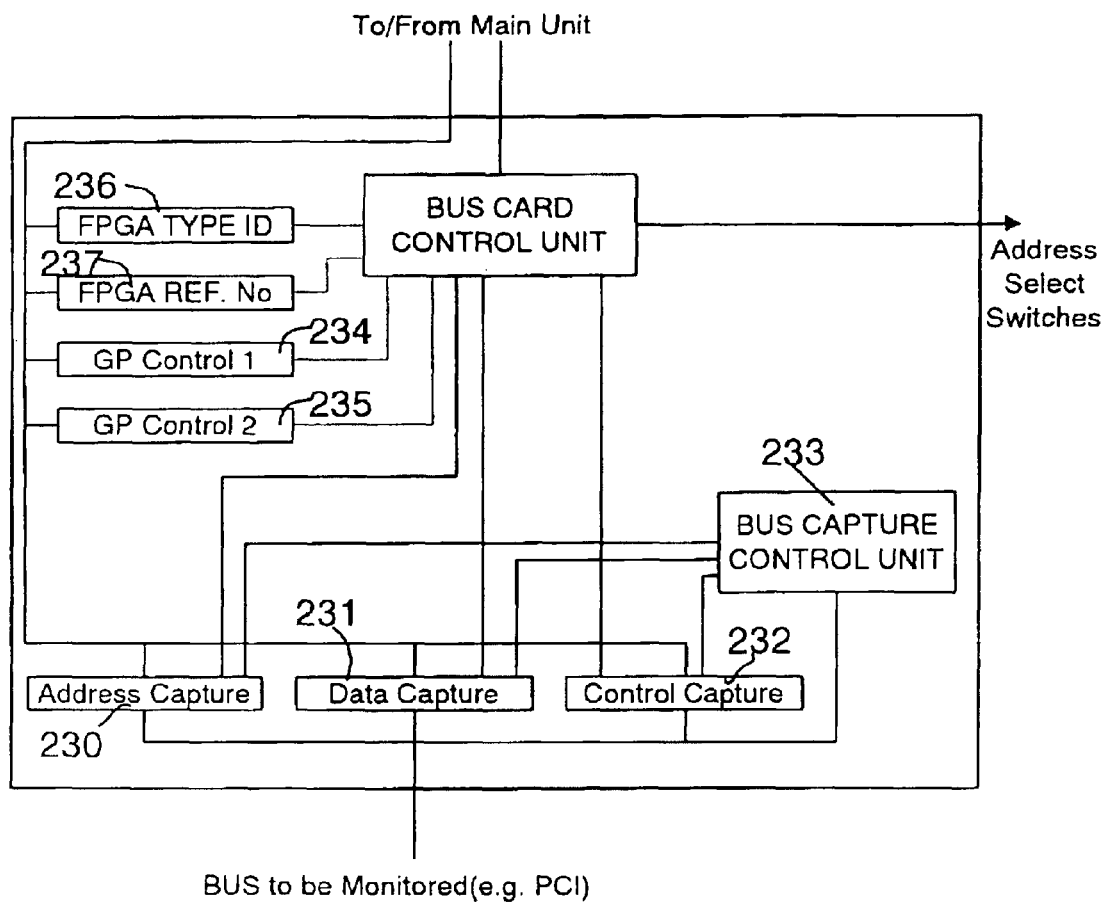
FIG. 14 is a block diagram of the internal circuitry of the bus tester of FIG. 13.

Data may be sent to and received from the bus test card by the test apparatus. The flow of data is determined by control codes sent from the main test apparatus 9, 10 to the bus card control unit. The control unit controls the operation of the various elements on the bus test card and directs which elements should perform what function and when. Referring now to FIG. 14, in which an embodiment of bus monitor circuitry 12, the data from the data bus, the address, bus or the control bus is capturable using the data 231, address 230, and control capture circuits 232. These capture circuits take a snapshot picture of the data on the respective bus at any particular instant. The bus capture control unit 233 controls the operation of the capture circuits, determining when a "snapshot" should be taken and for which bus. The captured data may then be sent to the test system for analysis and/or display.

Two further registers, GP Control 1 & 2, 234, 235, are general purpose read/write registers for controlling miscellaneous functions within the FPGA and in particular for allowing dynamic modification of the operation of the FPGA, for example by providing a means for the reconfiguring the data capture circuits as data output devices to place data on a bus. This dynamic facility allows the bus test card to be reconfigured for different tests, without having to reprogram the actual FPGA matrix, which would require resetting the FPGA.

The use of a configurable device such as an FPGA permits the simple addition of new hardware and software features to a bus test card whenever extra tests or capabilities are required. It will however be readily appreciated by anybody skilled in the art that a bus test card may also be implemented using devices other than an FPGA, e.g. a combination of memory and logic circuit elements.

Each bus test card may also contain "identifiers", examples of which may include a FPGA Type ID and FPGA Rev. No. The FPGA Type ID 236 is a read only number identifying the type of bus card, i.e. whether it is for testing PCI, ISA etc. The FPGA Rev. No. 237, is used to identify the FPGA version the bus card contains. Thus software may test a bus test card 12 to determine what tests the card is capable of carrying out and have it perform only these tests. Hence, old bus test cards may be used with newer versions of the software, thus allowing for easy introduction of newer versions of bus cards according as buses, tests and circuits are developed and introduced, in that the test software is not limited to specific card versions.

It will be readily appreciated by anybody skilled in the art that although the present invention has been described in terms of use as a response circuit, 8, i.e. of taking a snapshot of the data available on the buses at a particular instant, the circuitry may also be suitably modified to place a signal on the buses at any instant. Thus the bus monitoring circuit 12 may be used for creating test signals as well as measuring the responses to test signals. This enables the generation of a test signal by a bus test card, for example a card connected to the ISA bus, and the measurement of the test signal by the processor control circuit 6.

One problem with ROM emulation is that it will not work if the section between the boot ROM and the processor on the UUT is faulty. However, as the purpose of testing in a manufacturing line is to identify faulty circuits, this is not a problem. Since failure to load the program will clearly identify a fault.

Figure 15:
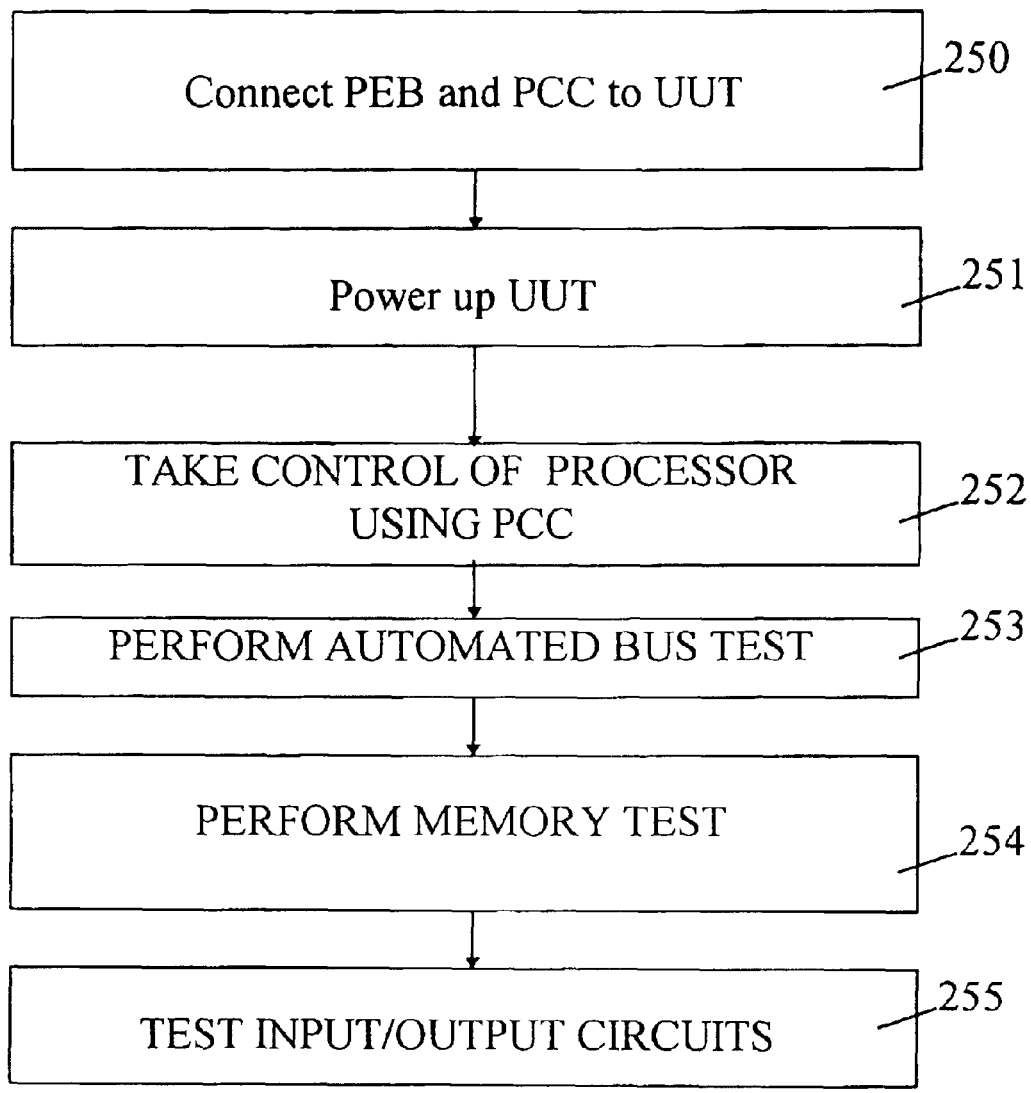
FIG. 15 is a flow chart showing the steps of an example test procedure according to the present invention.

An example test sequence using the above systems, as illustrated in FIG. 15, may comprise the following steps:

1. Connect 250 the unit to be tested (UUT) to the PCC, PEB and optionally bus tester board. These connections may be made either manually or automatically.
2. Switch 251 on the power to the UUT.
3. Take control 252 of the processor of the UUT using the processor control circuit.
4. Perform 253 an automated bus test (if using the bus tester board) using the bus tester and PCC.
5. Perform 254 a memory test using the PCC.
6. Test 255 the Input/Output devices in sequence using the PCC and PEB. These tests may include testing for the operation of power management, i.e. emulating wake-up events.

Any failure identified by the FTC during one of the steps would identify the UUT as a 'bad' board. For example, if the Processor Control Circuit failed to take control of the processor of the UUT, then this would indicate a 'bad' board.

The results of the tests may be presented to a test system user by means of a suitable graphical interface available on the host computer of the FTC or other suitable display means, e.g. a printer.

As the tests are in effect controlled by an external device, i.e. the FTC 10 details of the test results including diagnosis information may be provided. In existing systems a failure in the board may have prevented the UUT from booting to the operating system in this scenario, no information would be available as to why the device failed. Using the herein described systems and methods, a report detailing the tests passed and the tests failed may be prepared for use by an quality (SPC) system and/or by a re-work/failure analysis section. Moreover, as the area of failure may be identified any board which fails may be routed to an appropriate re-work section without further analysis or testing.

By running tests through the processor control circuit, the UUT's normal Operating System (e.g. Windows 95) can be bypassed to radically improve test speed. Furthermore the redundancy of the Operating System performs tasks apart from test tasks may be eliminated using the herein described system and method.

Also as wake-up events may now be simulated, the requirement for manual intervention is eliminated during the test process.

While the particular Method and System for Testing Microprocessor Based Boards in a Manufacturing Environment as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A test system for testing a processor circuit board having at least one processor and at least one peripheral connector comprising:

a processor control circuit, adapted to connect to the processor circuit board under test, enabling test routines to be run on the processor of the processor circuit board;

a peripheral emulator circuit, having a connector for connecting to at least one peripheral connector on the processor circuit board under test, for emulating at least one function of at least one peripheral device;

a response circuit measuring the response of the processor circuit board under test to a test routine; and a main controller in electronic communication with the processor control circuit and the response circuit, wherein the processor control circuit is responsive to instructions received from the main controller to cause the processor on the processor circuit to run a test routine and further wherein the response circuit communicates results of the test routine to the main controller; and wherein the peripheral emulator circuit is in electronic communication with the main controller and sends electronic signals to the processor circuit board under test in response to a control signal from the main controller and the electronic signal sent by the peripheral emulator circuit may comprise a wake up event signal.

2. A test system according to claim 1, wherein the processor control circuit comprises a ROM emulator.

3. A test system according to claim 1, wherein the processor control circuit comprises a debug port connection circuit which connects to a debug port of the processor on the processor circuit board.

4. A test system according to claim 1 wherein the processor control circuit comprises an adapter circuit to enable the test system to test more than one processor type.

5. A test system according to claim 1 wherein the peripheral emulator circuit may emulate the peripheral device selected from the group consisting of mouse, keyboard, SCSI interface, video card, modem, serial port, parallel port, audio interface, hard drive, floppy drive, and CD-ROM.

6. A test system according to claim 1, in which the peripheral emulator circuit is responsive to signals from the processor circuit board under test and generates appropriate signals enabling the operation of the processor circuit board under test to be tested.

7. A test system according to claim 1, wherein the response circuit is implemented in the processor control circuit.

8. A test system according to claim 1, wherein the response circuit is implemented in the peripheral emulator circuit.

9. A test system according to claim 1, wherein the test system further comprises a BUS tester, adapted to connect to a bus on the processor circuit board under test for selectively sending and receiving data signals from the bus.

10. A test system according to claim 9, wherein the response circuit is selectively implemented in the processor control circuit, the peripheral emulator circuit and the BUS tester.

11. A test system according to claim 9, wherein the main controller comprises a PC-card insertable in a computer having circuitry for selectively communicating with the BUS tester, the peripheral emulator circuit, the processor control circuit and the response circuit.

12. A test system according to claim 1, wherein the test system provides a pass/fail result.

13. A test system according to claim 1, further comprising a means for connecting the test system to another system to provide details of results.

14. A test system according to claim 1, wherein the test system is adapted to cause the re-direction of failed processor boards out of a main manufacturing line and into a re-work or analysis area.

15. A test system according to claim 14, wherein the test system is automated with a sensor indicating the arrival of a processor circuit board to be tested wherein the test system further comprises a BUS tester and a connector device for selectively interconnecting the BUS tester, the peripheral emulator circuit, the processor control circuit or the response circuit to the processor circuit board to be tested, and further wherein the test system determines whether the device passes or fails a test and only allowing the device which passes the test to progress to the next stage in the manufacturing line.

16. A method for testing a processor circuit board having at least one processor and at least one peripheral connector, using a test system comprising a peripheral emulator and a processor controller, comprising the steps of:

connecting the peripheral emulator to a peripheral connector on the processor circuit board;

connecting the processor controller for controlling the processor on the processor circuit board to the processor circuit board;

sending a wake up signal from the peripheral emulator to the processor circuit board on receiving a control signal from the main controller; and instructing the processor controller to cause the processor on the processor circuit board to run a test program to send test data to the peripheral emulator and check for a response from the peripheral emulator indicating the success or failure of the test.

17. A method for testing a processor circuit board having at least one processor and at least one peripheral connector, using a test system comprising a peripheral emulator and a processor controller, comprising the steps of:

connecting the peripheral emulator to a peripheral connector on the processor circuit board;

connecting the processor controller for controlling the processor on the processor circuit board to the processor circuit board;

sending a wake up signal from the peripheral emulator to the processor circuit board on receiving a control signal from the main controller;

instructing the processor controller to cause the processor on the processor circuit board to run a test program; and instructing the peripheral emulator to send test data to the processor, and where the response from the processor controller indicates the success or failure of the test.

18. A peripheral emulator device for emulating at least one function of at least one peripheral device having a suitable connection means enabling a electronic connection to be made with a processor motherboard under test and wherein the peripheral emulator device is adapted to send test signals to the processor motherboard under test without a request signal from the processor motherboard and wherein a test signal is a wake-up event.

19. A peripheral emulator device according to claim 18, wherein the peripheral emulator device is adapted to respond to request signals sent from a processor motherboard under test in a predetermined fashioned.

20. A peripheral emulator device according to claim 18, wherein the peripheral emulator is provided with a control means enabling it to communicate with a main controller of a test system.

21. A peripheral emulator device according to claim 20, wherein the control means permits data to be transmitted selectively to and from the peripheral emulator device to the main controller.

22. A peripheral emulator device according to claim 21, wherein the peripheral emulator device is responsive to instructions from the main controller to perform at least one task.

23. A peripheral emulator device according to claim 22, wherein a task is the sending of a wake-up event to the processor motherboard under test.

* * * * *